US010544294B2

(12) United States Patent
Cartier

(10) Patent No.: US 10,544,294 B2
(45) Date of Patent: Jan. 28, 2020

(54) BINDER FOR INJECTION MOULDING COMPOSITIONS

(71) Applicant: COMADUR S.A., Le Locle (CH)

(72) Inventor: Damien Cartier, Besancon (FR)

(73) Assignee: COMADUR S.A., Le Locle (CH)

( * ) Notice: Subject to any disclaimer, the term of this patent is extended or adjusted under 35 U.S.C. 154(b) by 30 days.

(21) Appl. No.: 16/030,132

(22) Filed: Jul. 9, 2018

(65) Prior Publication Data

US 2018/0312674 A1 Nov. 1, 2018

Related U.S. Application Data

(63) Continuation of application No. 14/893,857, filed as application No. PCT/EP2014/060613 on May 23, 2014, now Pat. No. 10,047,216.

(30) Foreign Application Priority Data

May 28, 2013 (CH) .......................... 1021/13
Jul. 15, 2013 (EP) .................................. 13176532

(51) Int. Cl.

| | | |
|---|---|---|
| *C08L 23/06* | (2006.01) | |
| *C04B 14/32* | (2006.01) | |
| *C04B 14/30* | (2006.01) | |
| *C04B 24/36* | (2006.01) | |
| *C04B 26/06* | (2006.01) | |
| *C04B 35/10* | (2006.01) | |
| *C04B 35/48* | (2006.01) | |
| *C04B 35/56* | (2006.01) | |
| *C04B 35/584* | (2006.01) | |
| *C04B 35/632* | (2006.01) | |
| *C04B 35/634* | (2006.01) | |
| *B22F 3/22* | (2006.01) | |
| *B22F 1/00* | (2006.01) | |
| *C04B 111/00* | (2006.01) | |
| *C04B 111/70* | (2006.01) | |

(52) U.S. Cl.
CPC .............. *C08L 23/06* (2013.01); *C04B 26/06* (2013.01); *C04B 35/10* (2013.01); *C04B 35/48* (2013.01); *C04B 35/5607* (2013.01); *C04B 35/5611* (2013.01); *C04B 35/5626* (2013.01); *C04B 35/584* (2013.01); *C04B 35/632* (2013.01); *C04B 35/63408* (2013.01); *C04B 35/63416* (2013.01); *C04B 35/63424* (2013.01); *C04B 35/63428* (2013.01); *C04B 35/63492* (2013.01); *B22F 3/225* (2013.01); *B22F 2001/0066* (2013.01); *C04B 2111/00137* (2013.01); *C04B 2111/70* (2013.01); *C04B 2235/6022* (2013.01)

(58) Field of Classification Search
CPC ......... C08L 23/06; C04B 14/32; C04B 14/30; C04B 24/36
USPC ....................................................... 524/229
See application file for complete search history.

(56) References Cited

U.S. PATENT DOCUMENTS

| | | |
|---|---|---|
| 5,254,613 A | 10/1993 | Bayer et al. |
| 5,266,264 A | 11/1993 | Miura et al. |
| 6,376,585 B1 | 4/2002 | Schofalvi et al. |
| 2003/0220424 A1 | 11/2003 | Schofalvi et al. |
| 2014/0336034 A1 | 11/2014 | Cartier |

OTHER PUBLICATIONS

Jafar Firouzi, et al., "Rheological Behavior of Metal Powder Suspensions Under Dynamic Loading", Iranian Polymer Journal, 2006, pp. 127-134, XP055101429, http://www.sid.ir/en/vewssid/j_pdf/81320060204.pdf.

International Search Report dated Jun. 25, 2014 for PCT/EP2014/060613 filed on May 23, 2014.

*Primary Examiner* — Deve V Hall

(74) *Attorney, Agent, or Firm* — Oblon, McClelland, Maier & Neustadt, L.L.P.

(57) ABSTRACT

A binder for an injection moulding composition includes: from 35 to 54% by volume of a polymeric base, from 40 to 55% by volume of a mixture of waxes, and approximately 10% by volume of a surfactant, wherein the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

20 Claims, No Drawings

BINDER FOR INJECTION MOULDING COMPOSITIONS

The present application is a continuation application of U.S. patent application Ser. No. 14/893,857, which is a national phase application in the United States of International patent application PCT/EP2014/060613 filed May 23, 2014 which claims priority on Swiss patent Application No CH01021/13 filed May 28, 2013 and European Patent Application No. 13176532.3 filed Jul. 15, 2013. The entire disclosures of the above patent applications are hereby incorporated by reference.

The invention concerns a binder composition for injection moulding and an injection moulding composition (feedstock) intended for the manufacture of shaped metallic or ceramic parts.

Powder metallurgy techniques are used in the manufacture of hard materials for the jewelry making and watch making industry, or for technical applications such as the medical, electronics, telephone or tooling industry, machining cutting inserts, the consumer goods industry, and particularly for hard materials generally referred to by the generic name of inorganic "ceramics". The inorganic synthesis material obtained will be termed 'ceramic' here, regardless of the nature of the material, be it sapphire, ruby, artificial diamond, sapphire glass, ceramic, micro-magnet, metal, alloy or other.

The basic raw materials are different in nature, generally speaking, and include at least on the one hand ceramic powder, and on the other hand organic binders, such as resins or plastic materials or suchlike, which can be injection moulded and provide good solidity of the component made with the mixture of all the raw materials. Other additives may be included in the mixture. These raw materials may also be of different textures: solid, powder, liquid or a paste. The structure of the mixture may also change during its creation, in particular, and not limited to, when the complementary components of a resin undergo a polymerization reaction.

The overall procedure for the manufacture of an inorganic ceramic component includes at least the following steps:
  preparing raw materials;
  mixing raw materials, or/and pre-mixing two-by-two (or more) if required;
  homogeneous mixing;
  granulating;
  pressing or moulding, in particular in a moulding chamber, a quantity of powder or feedstock pellets obtained from the mixing and granulating, to create a "green" component. This moulding may be carried out by injection, under pressure, in particular in a screw injector including means for heating this quantity of powder or feedstock pellets obtained from the mixing and granulating;
  debinding in an oven for combustion or dissolution of certain constituents of the mixture;
  heat treating the "green" component after debinding, for the sintering process to give the finished component its final coherency. This heat treatment causes dimensional shrinkage, which makes it possible to obtain a component with the final dimensions,
  surface finishing treatment of the component.

It is a particular object of the invention to offer an optimised binder for injection moulding compositions that facilitates power metallurgy mixing to obtain ceramics or metals, in order to obtain a product of highly reproducible quality, with a controlled shrinkage coefficient.

There are already known, for example from U.S. Pat. No. 5,145,900, thermoplastic materials (feedstock) for the manufacture of moulded ceramic parts that contain a sinterable inorganic powder and a polymeric organic binder, which is essentially formed of a mixture of polyoxymethylene and of polyoxymethylene and polyoxolane copolymers.

These feedstocks were however found to have a number of drawbacks, such as, for example, insufficient fluidity for injection moulding, and problems with products retaining their moulded shapes which suffered from cracking or lamination. This was particularly the case for parts with complex shapes. They are also responsible for environmental problems caused by the necessity to use aggressive products such as nitric acid, especially in the final removal of the organic phase. Moreover, the use of water in the organic binder removal process is problematic in the event that feedstocks contain metallic materials which risk being oxidised.

Consequently, it is an object of the present invention to provide a binder for moulding compositions that overcomes the aforementioned drawbacks, and more specifically aims to improve the homogeneity and the fluidity of the feedstock to allow the manufacture of metallic or ceramic parts of more complex shapes, to reduce production cycle times, to increase the mechanical resistance of the "green" debinded bodies to production stresses (handling and various machining operations) and finally which avoids the necessity of using products that are harmful to the environment to remove the organic binder, by replacing said products with non-polluting solvents which can be eliminated by a simple heat treatment.

The invention therefore concerns a binder for injection moulding compositions including:
  from 35 to 54% by volume of a polymeric base,
  from 40 to 55% by volume of a mixture of waxes or a mixture of wax and palm oil,
  and approximately 10% by volume of a surfactant,
  wherein the polymeric base contains ethylene and methacrylic or acrylic acid copolymers, or ethylene copolymers comprising a maleic anhydride or a mixture of such copolymers, in addition to polyethylene, polypropylene and an acrylic resin, the respective quantities of the binder components being such that added together, they do not exceed 100%.

Preferably, the binder of the invention includes 2 to 7% by volume of one of said copolymers or their mixtures, around 25% by volume of polyethylene, 2 to 15% by volume of polypropylene and 6 to 15% by volume of acrylic resin.

According to a variant of the invention, the binder for injection moulding compositions includes:
  from 35 to 54% by volume of a polymeric base,
  from 40 to 55% by volume of a mixture of waxes or a mixture of wax and palm oil,
  and approximately 10% by volume of a surfactant,
  wherein the polymeric base contains 2 to 7% by volume of an ethylene vinyl acetate copolymer, approximately 25% by volume of polyethylene, from 2 to 15% by volume of polypropylene and 6 to 15% by volume of acrylic resin, the respective quantities of the binder components being such that added together, they do not exceed 100%.

It will be noted that the selected quantity of ethylene vinyl acetate copolymers in the above range (2 to 7% by volume) is important for creating 'green' components (injection moulded parts before debinding and sintering) that are sufficiently rigid to maintain their shape especially on removal from the mould after injection; this aspect is increasingly important the smaller the section of the parts.

Typically a quantity of around 15% of these polymers does not provide sufficient stiffness on removal from the mould for green components of small section.

According to a preferred method, the ethylene and methacrylic or acrylic acid copolymer contains 3 to 10% by weight of a methacrylic or acrylic comonomer, the copolymer of ethylene and vinyl acetate contains 7 to 18% by weight of vinyl acetate comonomer, and the copolymer of ethylene and anhydride is a random copolymer of ethylene and maleic anhydride with a melting point of 100 to 110° C. or a copolymer of HD polyethylene and a modified anhydride with a melting point of 130 to 134° C.

Preferably, the acrylic resin has a molecular weight of between 50000 and 220000 and an inherent viscosity of between 0.21 and 0.83 and is chosen from the group including polymers of isobutyl methacrylate, methyl methacrylate, ethyl methacrylate and N-butyle methacrylate, and copolymers of isobutyl methacrylate and N-butyle methacrylate and of methyl methacrylate, N-butyle methacrylate or a mixture of these polymers and/or copolymers. 'Inherent viscosity' means the viscosity of a solution containing 0.25 g of polymer in 50 ml of methylene chloride measured at 20° C. with a Cannon-Fenske viscometer.

Advantageously, the wax is a Carnauba wax or a paraffin wax, or a palm oil, or a mixture of these elements, typically a mixture of Carnauba wax and a paraffin wax or a mixture of Carnauba wax and a palm oil. According to another preferred feature, the surfactant is an N,N'-ethylene bis-stearamide or a mixture of stearic and palmitic acids (stearin), or a mixture of these elements.

According to another feature, the surfactant and the acrylic resins are soluble in isopropyl alcohol and/or terebenthine essence.

The invention also concerns an injection moulding composition (feedstock) intended for the manufacture of shaped metallic or ceramic parts including 76 to 96% by weight of an inorganic powder and 4 to 24% by weight of binder including:
  from 35 to 54% by volume of a polymeric base,
  from 40 to 55% by volume of a mixture of waxes,
  and approximately 10% by volume of a surfactant,
  wherein the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

According to a specific feature, the inorganic powder of the injection moulding composition may be chosen from the group including an oxide, nitride, carbide or metal powder or mixture of said powders and preferably the inorganic powder is chosen from the group including alumina powder, zirconium oxide powder, chromium carbide powder, titanium carbide powder or tungsten carbide powder, tungsten metal or silicon nitride powder, stainless steel powder, titanium metal powder or a mixture of these powders.

According to the preferred embodiments of the injection moulding composition, the latter contains in % by weight:
  76 to 88% of alumina and 12 to 24% of binder according to the invention as defined above, or
  76 to 88% of alumina and 0.1 to 0.6% of magnesium oxide and 12 to 24% of the binder of the invention, or
  58 to 86.5% of zirconium oxide and 3.9 to 4.6% of yttrium oxide and 0.18 to 18.5% of alumina and 9 to 22% of the binder of the invention, or
  61.5 to 84% of zirconium oxide and 3.9 to 4.6% of yttrium oxide and 0.2 to 9% of alumina and 2 to 5.5% of inorganic pigments from a list including iron oxide, cobalt oxide, chromium oxide, titanium oxide, manganese oxide, zinc oxide or a mixture of said oxides and 9 to 22% of the binder of the invention, or
  88 to 91% of chromium or titanium carbide, and 9 to 12% of the binder of the invention, or
  93 to 96% of tungsten carbide or tungsten metal and 4 to 7% of the binder of the invention, or
  78 to 85% of silicon nitride and 15 to 22% of binder of the invention.

This invention will now be illustrated in more detail by means of the following non-limiting examples.

EXAMPLE 1

The polymeric part of the binder is mixed with a black zirconium oxide powder (such as St. Gobain Zir Black) at a temperature of around 150° C. to create a premix. To said premix are added the waxes and surfactant, and the temperature is further increased to around 180° C. to form a kind of homogeneous paste, which is then cooled and granulated until solidification, then kept to form feedstock that can be used in the manufacture of a shaped part by injection according to a known technique.

This technique typically includes a high pressure injection moulding operation using heat in a mould with cavities. The part is cooled in the cavity and then ejected from the mould. The entire process takes place at around 180° C. The 'green' component is then debinded before being sintered. The debinding removes part of the organic binder from the part to leave only enough binder to maintain the cohesion, or in other words the moulded shape of the 'green' component. The binder is typically removed from the 'green' component by heating a solvent in which the part is immersed. During this operation, at least 40% of the binder compounds must be dissolved. With the binder of the invention, the 'green' component is typically immersed in the solvent and heated to a temperature of around 70° C. At this temperature, the wax mixture or wax and oil mixture thermally decomposes while the surfactants and the acrylic resin are chemically dissolved. Once the debinding operation is complete, the part is porous. The part is then placed in a high temperature oven in order, in the first instance, to remove the remaining binder (typically at a temperature of less than 400° C.), this operation being facilitated by the porosity left in the part during debinding, and then, in a second phase, to sinter the part at a high temperature.

In this example, more specifically, 17.2 kg of zirconium powder (86% by weight) and 2.8 kg of binder (approx. 14% by weight) were used having the following volumetric composition:
  24% of HD polyethylene
  10% of polypropylene
  4% of copolymer of ethylene and methacrylic acid (with 6.5% by weight of methacrylic acid, for example a type such as "Nucrel™" by DuPont)
  10% of an isobutyl methacrylate polymer resin having a molecular weight of 195,000 (for example a type such as 'Elvacite™ 2045' by Lucite International)
  1% of an n-butyl and isobutyl methacrylate polymer resin having a molecular weight of 195,000 (for example a type such as 'Elvacite™ 2046' by Lucite International)
  11% of Carnauba wax
  31% of a paraffin wax (for example a type such as 'Carisma 54T™' by Alpha Wax BV)
  6% of N,N' Ethylene-bis(stearamide)

3% of stearic palmitic acid mixture (for example a type such as Stearin by Dubois).

EXAMPLE 2

The same type of feedstock as in Example 1 above is prepared replacing black zirconium oxide with white zirconium oxide, and using slightly different values for the various binder components, more specifically:

26% of HD polyethylene
10% of polypropylene
4% of copolymer of ethylene and methacrylic acid
11% of 'Elvacite 2045' resin
1% of 'Elvacite 2046' resin
11% of Carnauba wax
29% of paraffin wax
8% of N,N' Ethylene-bis(stearamide)

EXAMPLE 3

Using the same organic binder components again, with slightly different volumetric proportions, other feedstocks may be prepared with various ceramic or metallic powders, more specifically with alumina, with a shrinkage index of 1.19 or 1.30 (translucent), or chromium carbide or titanium carbide, tungsten carbide (of different qualities) and tungsten metal, according to the following table:

| Binder (% by vol.) | $Al_2O_3$ (85-6% by weight) | $Al_2O_3$ (transl.) (78-9% by weight) | CrC (90% by weight) TiC (89% by weight) | CW (94-94.5% by weight) | W (94-5% by weight) |
|---|---|---|---|---|---|
| HD polyethylene | 26 | 28 | 24 | 25/25 | 26/25 |
| Polypropylene | 6 | 2 | 6 | 8/8 | 10/10 |
| Copolymer ('Nucrel') | 3.5 | 3 | 3 | 4/4 | 4/4 |
| 'Elvacite 2045' resin | 6 | 5 | 5 | 7/7 | 9/7 |
| 'Elvacite 2046' resin | 1 | 1 | 1 | 1/1 | 1/1 |
| Carnauba wax | 12 | 12 | 12 | 11/11 | 11/11 |
| Paraffin wax | 35 | 39 | 39 | 34/37 | 29/32 |
| N,N'ethylene bis(stearamide) | 5.5 | 5 | 5 | 5/5 | 5/5 |
| Stearin (Dubois) | 5 | 5 | 5 | 5/2 | 5/5 |

The invention claimed is:

1. A binder for injection moulding composition including:
from 35 to 54% by volume of a polymeric base,
from 40 to 55% by volume of a mixture of waxes or a mixture of wax and palm oil,
and approximately 10% by volume of a surfactant,
wherein the polymeric base contains an ethylene and methacrylic or acrylic acid copolymer, or an ethylene copolymers comprising a maleic anhydride, or a mixture of these copolymers, in addition to polyethylene, polypropylene and an acrylic resin, the respective quantities of the binder components being such that added together, they do not exceed 100%.

2. The binder according to claim 1, including 2 to 7% by volume of one of said copolymers or their mixtures, around 25% by volume of polyethylene, 2 to 15% by volume of polypropylene and 6 to 15% by volume of acrylic resin.

3. A binder for injection moulding composition including:
from 35 to 54% by volume of a polymeric base,
from 40 to 55% by volume of a mixture of waxes or a wax and palm oil mixture,
and approximately 10% by volume of a surfactant,
wherein the polymeric base contains 2 to 7% by volume of an ethylene vinyl acetate copolymer, approximately 25% by volume of polyethylene, from 2 to 15% by volume of polypropylene and 6 to 15% by volume of acrylic resin, the respective quantities of the binder components being such that added together, they do not exceed 100%.

4. The binder according to claim 1, wherein the ethylene and methacrylic or acrylic acid copolymer contains 3 to 10% by weight of a methacrylic or acrylic comonomer, the copolymer of ethylene and vinyl acetate contains 7 to 18% by weight of vinyl acetate comonomer, and the copolymer of ethylene and anhydride is a random copolymer of ethylene and maleic anhydride with a melting point of 100 to 110° C. or a copolymer of HD polyethylene and a modified anhydride with a melting point of 130 to 134° C.

5. The binder according to claim 1, wherein the acrylic resin has a molecular weight of between 50000 and 220000 and an inherent viscosity of between 0.21 and 0.83 and is chosen from the group including copolymers of isobutyl methacrylate, methyl methacrylate, ethyl methacrylate and N-butyl methacrylate, and copolymers of isobutyl methacrylate and N-butyl methacrylate and of methyl methacrylate, N-butyle methacrylate or a mixture of these polymers and/or copolymers.

6. The binder according to claim 1, wherein the wax mixture includes a Carnauba wax and a paraffin wax or the wax mixture includes a Carnauba wax and a palm oil.

7. The binder according to claim 1, wherein the surfactant is an N,N'-ethylene bis(stearamide) or a mixture of stearic and palmitic acids (stearin), or a mixture of these elements.

8. The binder according to claim 1, wherein that the surfactant and the acrylic resins are soluble in isopropyl alcohol and/or terebenthine essence.

9. An injection moulding composition (feedstock) for a manufacture of shaped metallic or ceramic parts including 76 to 96% by weight of an inorganic powder and 4-24% by weight of a binder according to claim 1.

10. The injection moulding composition according to claim 9, wherein the inorganic powder is selected from the group including an oxide, nitride, carbide, metal powder or a mixture thereof.

11. The injection moulding composition according to claim 9, wherein said inorganic powder is chosen from the group including an alumina powder, a zirconium oxide powder, a chromium carbide powder, a titanium carbide powder or a tungsten carbide powder, a tungsten metal or silicon nitride powder, a stainless steel powder, a titanium metal powder or a mixture of said powders.

12. The injection moulding composition according to claim 10, which contains in weight percentage:

76 to 88% of alumina, and 12 to 24% of binder, 76 to 88% of alumina and 0.1 to 0.6% of magnesium oxide and 12 to 24% of binder, 58 to 86.5% of zirconium oxide and 3.9 to 4.6% of yttrium oxide and 0.18 to 18.5% of alumina and 9 to 22% of binder, 61.5 to 84% of zirconium oxide and 3.9 to 4.6% of yttrium oxide and 0.2 to 9% of alumina and 2 to 5.5% of inorganic pigments from a list including iron oxide, cobalt oxide, chromium oxide, titanium oxide, manganese oxide, zinc oxide or a mixture of said oxides and 9 to 22% of binder, 88 to 91% of chromium or titanium carbide, and 9 to 12% of binder, 93 to 96% of tungsten carbide or tungsten metal and 4 to 7% of binder, or 78 to 85% of silicon nitride, and 15 to 22% of binder.

13. The binder according to claim 3, wherein the copolymer of ethylene and vinyl acetate contains 7 to 18% by weight of vinyl acetate comonomer.

14. The binder according to claim 3, wherein the acrylic resin has a molecular weight of between 50000 and 220000 and an inherent viscosity of between 0.21 and 0.83 and is chosen from the group including copolymers of isobutyl methacrylate, methyl methacrylate, ethyl methacrylate and N-butyl methacrylate, and copolymers of isobutyl methacrylate and N-butyl methacrylate and of methyl methacrylate, N-butyle methacrylate or a mixture of these polymers and/or copolymers.

15. The binder according to claim 3, wherein the wax mixture includes a Carnauba wax and a paraffin wax or the wax mixture includes a Carnauba wax and a palm oil.

16. The binder according to claim 3, wherein the surfactant is an N,N'-ethylene bis(stearamide) or a mixture of stearic and palmitic acids (stearin), or a mixture of these elements.

17. The binder according to claim 3, wherein the surfactant and the acrylic resins are soluble in isopropyl alcohol and/or terebenthine essence.

18. An injection moulding composition (feedstock) for a manufacture of shaped metallic or ceramic parts including 76 to 96% by weight of an inorganic powder and 4-24% by weight of the binder according to claim 3.

19. The injection moulding composition according to claim 18, wherein the inorganic powder is selected from the group including an oxide, nitride, carbide, metal powder or a mixture thereof.

20. The injection moulding composition according to claim 19, which contains in weight percentage:

76 to 88% of alumina, and 12 to 24% of binder, 76 to 88% of alumina and 0.1 to 0.6% of magnesium oxide and 12 to 24% of binder, 58 to 86.5% of zirconium oxide and 3.9 to 4.6% of yttrium oxide and 0.18 to 18.5% of alumina and 9 to 22% of binder, 61.5 to 84% of zirconium oxide and 3.9 to 4.6% of yttrium oxide and 0.2 to 9% of alumina and 2 to 5.5% of inorganic pigments from a list including iron oxide, cobalt oxide, chromium oxide, titanium oxide, manganese oxide, zinc oxide or a mixture of said oxides and 9 to 22% of binder, 88 to 91% of chromium or titanium carbide, and 9 to 12% of binder, 93 to 96% of tungsten carbide or tungsten metal and 4 to 7% of binder, or 78 to 85% of silicon nitride, and 15 to 22% of binder.

* * * * *